US005967722A

United States Patent [19]

Fett

[11] Patent Number: 5,967,722

[45] Date of Patent: Oct. 19, 1999

[54] LOCKING WASHER ARRANGEMENT

[75] Inventor: Gregory A. Fett, Fort Wayne, Ind.

[73] Assignee: Dana Corporation, Toledo, Ohio

[21] Appl. No.: 09/057,025

[22] Filed: Apr. 8, 1998

[51] Int. Cl.[6] .............................. F16B 39/10; F16B 39/24

[52] U.S. Cl. .......................... 411/120; 411/150; 411/163; 411/953

[58] Field of Search .................................... 411/120, 121, 411/149, 150, 160, 161, 162, 163, 910, 953, 143

[56] References Cited

U.S. PATENT DOCUMENTS

| | | | |
|---|---|---|---|
| 716,095 | 12/1902 | Peterson . | |
| 1,181,109 | 5/1916 | Carr . | |
| 2,124,249 | 7/1938 | Guiducci . | |
| 3,258,047 | 6/1966 | Loretan | 411/163 X |
| 4,620,428 | 11/1986 | Kopesky | 411/910 X |
| 4,737,058 | 4/1988 | Callman et al. | 411/120 |
| 5,409,338 | 4/1995 | McKinlay | 411/149 |
| 5,618,143 | 4/1997 | Gronin, II et al. | 411/120 X |
| 5,674,034 | 10/1997 | Bennett | 411/120 X |

*Primary Examiner*—Neill Wilson
*Attorney, Agent, or Firm*—Oldham & Oldham Co., L.P.A.

[57] ABSTRACT

A locking washer arrangement which includes two (2) washer members fabricated from a hardened steel material, a thicker one on the bottom and a thinner one on the top. The top surface of the top washer member and the bottom surface of the bottom washer member preferably have a relatively high coefficient of friction and may be grooved, embossed or otherwise roughened so they will grip the surfaces they come into contact with while the bottom surface of the top washer member and the top surface of the bottom washer member have a relatively low coefficient of friction to facilitate relative movement therebetween. Relatively long flexible tabs project radially outward from the periphery of the top washer member and distal ends are bent downwardly to engage and interlock between corresponding relatively short stiff tabs projecting radially outward from the periphery of the bottom washer member. A special magnetized socket is used to assemble the locking washer arrangement by temporarily attracting and holding the relatively long flexible tabs in the top washer member upward to permit the top washer member to rotate relative to the bottom washer member. When the special magnetized socket is removed, the relatively long flexible tabs in the top washer member engage and interlock between the relatively short stiff tabs in the bottom washer member to preclude further rotation between the top washer member and the bottom washer member.

22 Claims, 2 Drawing Sheets

FIG.-6
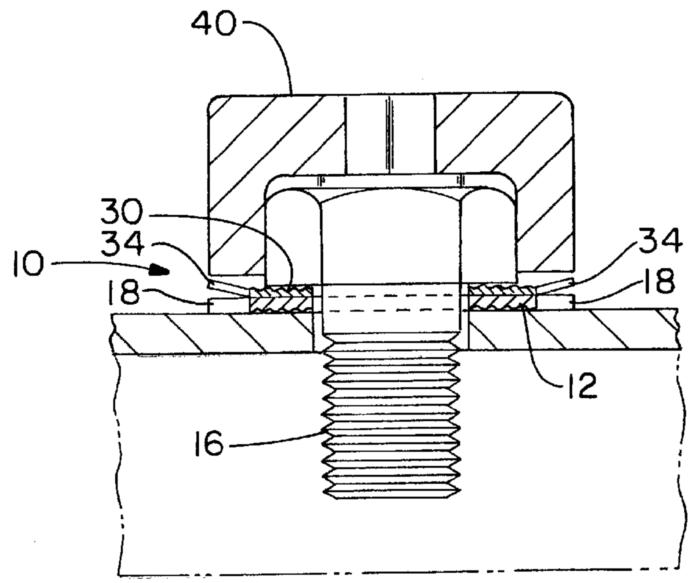
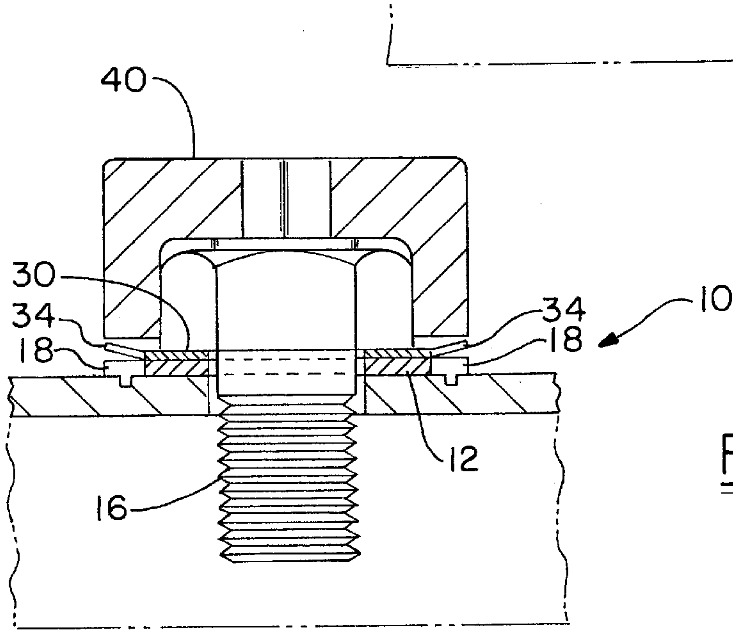
FIG.-7
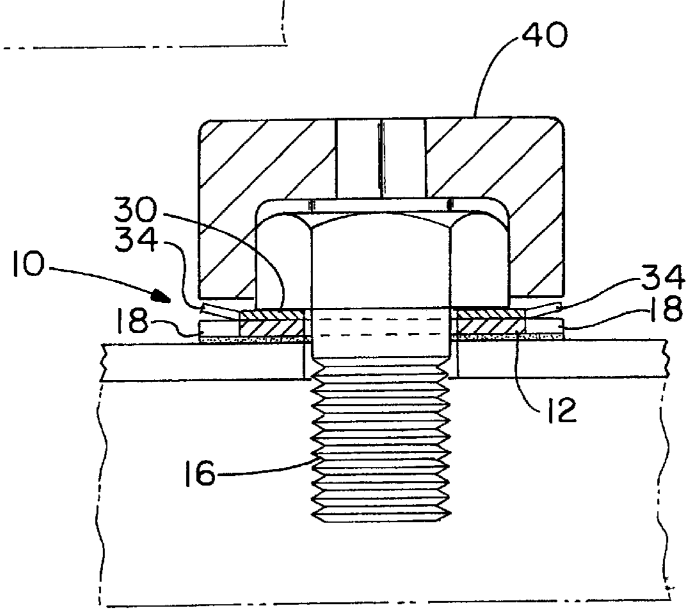
FIG.-8

LOCKING WASHER ARRANGEMENT

BACKGROUND AND SUMMARY OF THE INVENTION

The present invention relates generally to a new and novel locking washer arrangement. More particularly, the present invention relates to a new and novel locking washer arrangement which precludes threaded fasteners, such as threaded screws and bolts, from backing out or loosening in service and which provides a more positive lock than traditional thread adhesives.

Many assemblies exposed to conditions such as vibration and temperature variations are secured by threaded fasteners, such as threaded screws and bolts, which tend to back out or loosen in service over time. One known prior art method of precluding such threaded fasteners from backing out or loosening in service over time is to place a thread adhesive material on the threads prior to installation. However, such thread adhesive materials are messy to use, the thread adhesive materials may deteriorate over time, particularly in high temperature environments, and disassembly of the threaded fasteners, when desired, is often made more difficult by such thread adhesive materials. Accordingly, it would be desirable to provide a locking washer arrangement which precludes threaded fasteners, such as threaded screws and bolts, from backing out or loosening while in service over time and which provides a more positive lock than traditional known prior art thread adhesive materials.

A preferred embodiment of the present invention is, therefore, directed to a locking washer arrangement which includes two (2) washer members fabricated from a hardened steel material, a thicker one on the bottom and a thinner one on the top. The top surface of the top washer member and the bottom surface of the bottom washer member preferably have a relatively high coefficient of friction and may be grooved, embossed or roughened so they grip the surfaces they come into contact with while the bottom surface of the top washer member and the top surface of the bottom washer member preferably have a relatively low coefficient of friction to facilitate relative movement therebetween. Relatively long flexible tabs project radially outward from the periphery of the top washer member and have distal ends which are preferably bent downwardly to engage and interlock between corresponding relatively short stiff tabs projecting radially outward from the periphery of the bottom washer member. A special magnetized socket is used to assemble the locking washer arrangement by temporarily attracting and holding the relatively long flexible tabs in the top washer member upward to permit the top washer member to rotate relative to the bottom washer member. When the special magnetized socket is removed, the relatively long flexible tabs in the top washer member engage and interlock between the relatively short stiff tabs in the bottom washer member to preclude further rotation between the top washer member and the bottom washer member.

Other advantages and novel features of the present invention will become apparent in the following detailed description of the invention when considered in conjunction with the accompanying drawings.

BRIEF DESCRIPTION OF THE DRAWINGS

FIG. 6 is a cross-sectional side view of a locking washer arrangement in accordance with a preferred embodiment of the present invention installed under a threaded fastener, such as a threaded screw or bolt, with relatively long flexible tabs outwardly extending from the periphery of the top washer member being lifted by a special magnetized socket to permit relative rotation between the top washer member and the bottom washer member, with the bottom surface of the bottom washer member having grooves to provide a relatively high coefficient of friction and facilitate the gripping of surfaces the bottom surface of the bottom of the member comes into contact with and with the top surface of the top washer member having grooves to provide a relatively high coefficient of friction and facilitate the gripping of surfaces the top surface of the top washer member comes into contact with.

FIG. 7 is a cross-sectional side view of a locking washer arrangement in accordance with a preferred embodiment of the present invention installed under a, threaded fastener, such as a threaded screw or bolt, with relatively long flexible tabs outwardly extending from the periphery of the top washer member beng lifted by a special magnetized socket to permit relative rotation between the top washer member and the bottom washer member, with the bottom surface of the bottom washer member mechanically keyed to the surface it comes into contact with.

FIG. 8 is a cross-sectional side view of a locking washer arrangement in accordance with a preferred embodiment of the present invention installed under a threaded fastener, such as a threaded screw or bolt, with relatively long flexible tabs outwardly extending from the periphery of the top washer member being lifted by a special magnetized socket to permit relative rotation between the top washer member and the bottom washer member, with the bottom surface of the bottom washer member bonded with an adhesive to the surface it comes, into contact with.

DETAILED DESCRIPTION OF THE DRAWINGS

Figure 1:
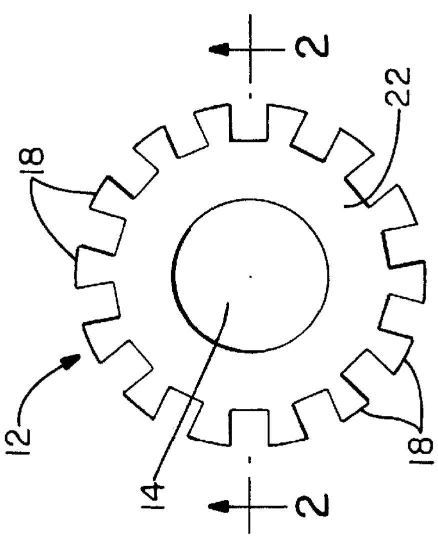
FIG. 1 is a top plan view of a bottom washer member used in a locking washer arrangement in accordance with a preferred embodiment of the present invention.
Figure 2:
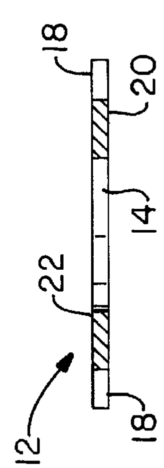
FIG. 2 is a cross-sectional side view of the bottom washer member used in a locking washer arrangement in accordance with a preferred embodiment of the present invention taken across line 2—2 in FIG. 1.

In the following detailed description of a preferred embodiment of the present invention, reference is made to the accompanying drawings which, in conjunction with this detailed description, illustrate and describe a preferred embodiment of a locking washer arrangement, generally identified by reference number 10, in accordance with the present invention. Referring now to the drawings, in which like-identified characters represent corresponding elements throughout the several views, attention is first directed to FIGS. 1 and 2, which illustrate a top plan view of a bottom washer member, generally identified by reference number 12, used in locking washer arrangement 10 and a cross-sectional side view of bottom washer member 12, respectively, used in locking washer arrangement 10 in accordance with a preferred embodiment of the present invention, bottom washer member 12 is generally circular in configuration and includes central opening 14 to permit threaded fastener 16, such as a threaded screw or bolt, to pass therethrough and a plurality of relatively short stiff tabs 18 extending outwardly from the periphery of bottom washer member 12. Bottom washer member 12 is preferably fabricated from a hardened spring steel material, although other materials may alternatively be used if desired, including other metallic materials, such as other steel or iron alloys, stainless steel and aluminum, and polymeric materials. Bottom surface 20 of bottom washer member 12 preferably has a relatively high coefficient of friction by, for example, grooving, embossing or otherwise roughening bottom surface 20, to facilitate the griping of surfaces bottom surface 20 comes into contact with. On the other hand, top surface 22 of bottom washer member 12 has a relatively low coefficient of friction to facilitate relative movement between top surface 22 and the surfaces top surface 22 comes into contact with. Alternately, bottom surface 20 of bottom washer member 12 may be mechanically keyed to the surface it comes into contact with or bonded with, for example, an adhesive to the surface it comes into contact with.

Figure 3:
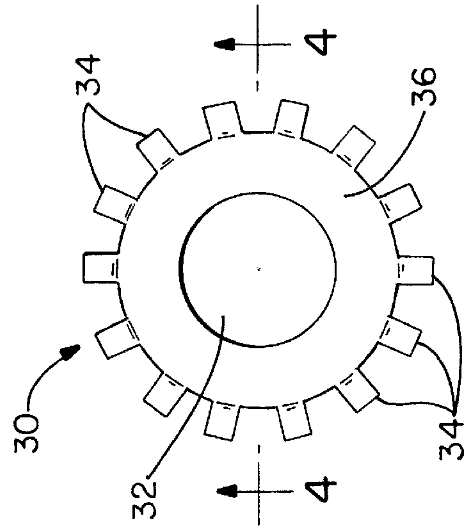
FIG. 3 is a top plan view of a top washer member used in a locking washer arrangement in accordance with a preferred embodiment of the present invention.
Figure 4:
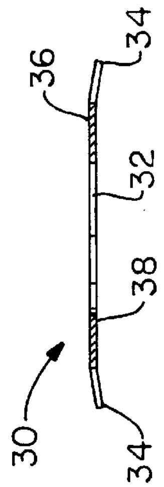
FIG. 4 is a cross-sectional side view of the top washer member used in a locking washer arrangement in accordance with a preferred embodiment of the present invention taken across line 4—4 in FIG. 3.

Referring now to FIGS. 3 and 4, which illustrate a top plan view of a top washer member, generally identified by reference number 30, used in locking washer arrangement 10 and a cross-sectional side view of top washer member 30, respectively, used in locking washer arrangement 10 in accordance with a preferred embodiment of the present invention, top washer member 30 is generally circular in configuration and includes central opening 32 to permit threaded fastener 16, such as a threaded screw or bolt, to pass therethrough and a plurality of relatively long flexible tabs 34 extending outwardly from the periphery of top washer member 30. Top washer member 30 is preferably fabricated from a magnetic material, most preferably a hardened spring steel material, although other magnetic materials may alternatively be used if desired, including other steel, magnetic stainless steel or iron alloys. Top surface 36 of top washer member 30 preferably has a relatively high coefficient of friction which is provided by, for example, grooving, embossing or otherwise roughening top surface 36, to facilitate the gripping of surfaces top surface 36 comes into contact with. On the other hand, bottom surface 38 of top washer member 30 preferably has a relatively low coefficient of friction to facilitate relative movement between bottom surface 38 of top washer member 30 and top surface 22 of bottom washer member 12. The thickness of bottom washer member 12 is preferably greater than the thickness of top washer member 30 so relatively long flexible tabs 34 outwardly extending from the periphery of top washer member 30 are more flexible and moveable than relatively short stiff tabs 18 extending outwardly from the periphery of bottom washer member 12.

Figure 5:
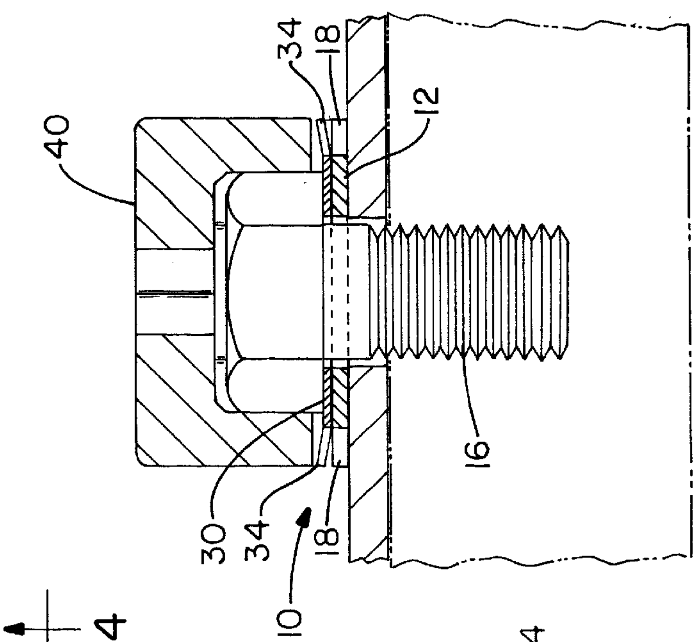
FIG. 5 cross-sectional side view of a locking washer arrangement in accordance with a preferred embodiment of the present invention installed under a threaded fastener, such as a threaded screw or bolt, with relatively long flexible tabs outwardly extending from the periphery of the top washer member being lifted by a special magnetized socket to permit relative rotation between the top washer member and the bottom washer member.

Referring now to FIG. 5, which illustrates a cross-sectional side view of locking washer arrangement 10 installed under threaded fastener 16, such as a threaded screw or bolt, with relatively long flexible tabs 34 extending outwardly from the periphery of top washer member 30 being lifted by special magnetized socket 40 to permit relative rotation between top washer member 30 and bottom washer member 12, relatively long flexible tabs 34 extending outwardly from the periphery of top washer member 30 are preferably bent downwardly on their distal ends to engage and interlock between corresponding relatively short stiff tabs 18 extending outwardly from the periphery of bottom washer member 12. Special magnetized socket 40 is used to assemble locking washer arrangement 10 by temporarily attracting and holding relatively long flexible tabs 34 of top washer member 30 upward so they are above and disengaged from relatively short stiff tabs 18 of bottom washer member 12 and top washer member 30 is then rotatable relative to bottom washer member 12. When special magnetized socket 40 is removed, relatively long flexible tabs 34 of top washer member 30 flex downwardly between corresponding relatively short stiff tabs 18 of bottom washer member 12 and relative rotation between top washer member 30 and bottom washer member 12 is precluded.

Although the present invention has been described above in detail, the same is by way of illustration and example only and is not to be taken as a limitation on the present invention. Accordingly, the scope and content of the present invention are to defined only by the terms of the appended claims.

What is claimed is:

1. A locking washer arrangement for precluding the backing out or loosening of a threaded fastener, said locking washer arrangement comprising:

a bottom washer member having a generally circular configuration with a central opening to permit the threaded fastener to pass therethrough and a plurality of relatively short stiff tabs extending outwardly from the periphery of said bottom washer; and a top washer member having a generally circular configuration with a central opening to permit the threaded fastener to pass therethrough and a plurality of relatively long flexible tabs extending outwardly and downwardly from the periphery of said top washer member such that said relatively long flexible tabs extending outwardly and downwardly from the periphery of said top washer member engage and interlock between corresponding said relatively shorter stiff tabs in said bottom washer to preclude relative rotation between said top washer member and said bottom washer member.

2. The locking washer arrangement in accordance with claim 1, further including a special magnetized socket which is used to assemble the locking washer arrangement by temporarily attracting and holding said relatively long flexible tabs extending outwardly from the periphery of said top washer member to permit said top washer member to rotate relative to said bottom washer member and when the special magnetized socket is removed, said relatively long flexible tabs extending outwardly from the periphery of said top washer member move downwardly and engage and interlock between corresponding said relatively short stiff tabs extending outwardly from the periphery of said bottom washer member to preclude further rotation between said top washer member and said bottom washer member.

3. The locking washer arrangement in accordance with claim 1, wherein said bottom surface of said bottom washer member is mechanically keyed to the surface it comes into contact with.

4. The locking washer arrangement in accordance with claim 1, wherein said bottom surface of said bottom washer member is bonded to the surface it comes into contact with.

5. The locking washer arrangement in accordance with claim 2, wherein said bottom washer member has a thickness which is greater than the thickness of said top washer member.

6. The locking washer arrangement in accordance with claim 5, wherein said bottom surface of said bottom washer member is mechanically keyed to the surface it comes into contact with.

7. The locking washer arrangement in accordance with claim 5, wherein said bottom surface of said bottom washer member is bonded to the surface it comes into contact with.

8. The locking washer arrangement in accordance with claim 5, wherein:

said top washer member has a top surface which has a relatively high coefficient of friction and a bottom surface which has a relatively low coefficient of friction; and said bottom washer member has a top surface which has a relatively low coefficient of friction and a bottom surface which has a relatively high coefficient of friction.

9. The locking washer arrangement in accordance with claim 8, wherein said top surface of said top washer member and said bottom surface of said bottom washer member are grooved to provide said relatively high coefficient of friction.

10. The locking washer arrangement in accordance with claim 8, wherein said top surface of said top washer member and said bottom surface of said bottom washer member are embossed to provide said relatively high coefficient of friction.

11. The locking washer arrangement in accordance with claim 8, wherein said top surface of said top washer member and said bottom surface of said bottom washer member are roughened to provide said relatively high coefficient of friction.

12. The locking washer arrangement in accordance with claim 8, wherein said top washer member is fabricated from a hardened spring steel material.

13. The locking washer arrangement in accordance with claim 1, wherein:

said top washer member has a top surface which has a relatively high coefficient of friction and a bottom surface which has a relatively low coefficient of friction; and said bottom washer member has a top surface which has a relatively low coefficient of friction and a bottom surface which has a relatively high coefficient of friction.

14. The locking washer arrangement in accordance with claim 13, wherein said top surface of said top washer member and said bottom surface of said bottom washer member are grooved to provide said relatively high coefficient of friction.

15. The locking washer arrangement in accordance with claim 13, wherein said top surface of said top washer member and said bottom surface of said bottom washer member are embossed to provide said relatively high coefficient of friction.

16. The locking washer arrangement in accordance with claim 13, wherein said top surface of said top washer member and said bottom surface of said bottom washer member are roughened to provide said relatively high coefficient of friction.

17. The locking washer arrangement in accordance with claim 1, wherein said top washer member is fabricated from a magnetic material.

18. The locking washer arrangement in accordance with claim 17, wherein said top washer member is fabricated from a hardened spring steel material.

19. The locking washer arrangement in accordance with claim 1, wherein said bottom washer member has a thickness which is greater than the thickness of said top washer member.

20. The locking washer arrangement in accordance with claim 19, further including a special magnetized socket which is used to assemble the locking washer arrangement by temporarily attracting and holding said relatively long flexible tabs extending outwardly from the periphery of said top washer member to permit said top washer member to rotate relative to said bottom washer member and when the special magnetized socket is removed, said relatively long flexible tabs extending outwardly from the periphery of said top washer member move downwardly and engage and interlock between corresponding said relatively short stiff tabs extending outwardly from the periphery of said bottom washer member to preclude further rotation between said top washer member and said bottom washer member.

21. The locking washer arrangement in accordance with claim 19, wherein:

said top washer member has a top surface which has a relatively high coefficient of friction and a bottom surface which has a relatively low coefficient of friction; and said bottom washer member has a top surface which has a relatively low coefficient of friction and a bottom surface which has a relatively high coefficient of friction.

22. The locking washer arrangement in accordance with claim 21, further including a special magnetized socket which is used to assemble the locking washer arrangement by temporarily attracting and holding said relatively long flexible tabs extending outwardly from the periphery of said top washer member to permit said top washer member to rotate relative to said bottom washer member and when the special magnetized socket is removed, said relatively long flexible tabs extending outwardly from the periphery of said top washer member move downwardly and engage and interlock between corresponding said relatively short stiff tabs extending outwardly from the periphery of said bottom washer member to preclude further rotation between said top washer member and said bottom washer member.

* * * * *